(12) United States Patent
Everett

(10) Patent No.: US 6,892,863 B2
(45) Date of Patent: May 17, 2005

(54) BICYCLE BRAKE ASSEMBLY WITH INTERCHANGEABLE BRAKE PADS

(76) Inventor: Richard C. Everett, 225 Sunshine La., West Lynn, OR (US) 97068

(*) Notice: Subject to any disclaimer, the term of this patent is extended or adjusted under 35 U.S.C. 154(b) by 0 days.

(21) Appl. No.: 10/075,580

(22) Filed: Feb. 15, 2002

(65) Prior Publication Data

US 2003/0155189 A1 Aug. 21, 2003

(51) Int. Cl.[7] .................................................. B62L 1/02
(52) U.S. Cl. ................ 188/238; 188/24.12; 188/250 G; 188/250 B; 188/250 E
(58) Field of Search .......................... 188/24.11, 24.12, 188/24.22, 24.21, 242, 234, 238, 240, 250 C, 250 B, 250 G, 250 E

(56) References Cited

U.S. PATENT DOCUMENTS

| | | | |
|---|---|---|---|
| 471,891 A | * 3/1892 | Pennay | 188/238 |
| 1,201,520 A | * 10/1916 | Sowle | 188/238 |
| 1,471,273 A | * 10/1923 | Lott | 188/238 |
| 5,896,955 A | * 4/1999 | Everett | 188/24.12 |

* cited by examiner

Primary Examiner—Matthew C. Graham
(74) Attorney, Agent, or Firm—Edward E. Roberts

(57) ABSTRACT

A bicycle brake pad assembly having a plurality of pad portions, the assembly configured to provide replacement and interchangeability of each of the pads. Each pad is of a separate multi-rubber or elastomer compound or composition, with each composition pre-selected to effect a separate braking result for each of the pad portions. A pad may be selected to provide stopping power while a different pad combination selected to improve wet and dry braking, to stop squealing and grabbing, or a combination of compounds may be utilized for different braking characteristics such as for racing conditions, or the like. The pad portions are configured, arranged and dimensioned so that each (and all) pad portions have a braking surface in contact with the rim generally simultaneously.

16 Claims, 3 Drawing Sheets

BICYCLE BRAKE ASSEMBLY WITH INTERCHANGEABLE BRAKE PADS

BACKGROUND OF THE INVENTION

The background of the invention will be discussed in two parts:

1. Field of the Invention

This invention relates to bicycle brake assemblies and more particularly to a bicycle brake shoe assembly for receiving unitary brake pads of dissimilar braking configurations and compounds that can be interchanged and rearranged for providing varying desired braking characteristics.

2. Description of the Prior Art

Bicycles commonly have braking assemblies that grip the bicycle wheel rim in response to operator manipulation of brake levers. Such brake assemblies are generally mounted to the bicycle frame and include brake shoes that are movably mounted on caliper assemblies that bridge the rim. The brake shoes have a brake pad of friction material for abutting and frictionally engaging the rim for slowing or stopping of the bicycle. The majority of such brake pads have some form of design in the engaging surface to promote friction, somewhat similar to the tread design of tires.

The material composition of the brake shoe contributes to its ability to stop the bicycle. In some prior art brake shoes, the composition is a friction material such as plastic or rubber impregnated with metal particles. Many of the prior art brake pads tend to squeal or chatter upon application, and in virtually all instances provide uneven wear of the brake pads at the point of engagement resulting in uneven application of force to the rim. Such brake pads have been generally rectangular in configuration with the fastening stud at the mid-point thereof.

An early prior art brake shoe is shown and described in U.S. Pat. No. 4,470,843 issued to Holtz on 11 Sep. 1984, wherein two adjacent brakes are employed on each caliper lever, with the brake shoes arranged for use in opposing pairs. One pair of brake shoes is formed of a material suitable for use in dry weather. Prior to operation of the bicycle, the rider manually positions one pair of opposing shoes for use on that ride for either wet or dry weather. To use the other pair of brake shoes, the rider must again make a manual adjustment to place the other pair of shoes in contact with the bicycle rim.

Early brake pads were typically composed of only one compound, which exhibited the short-coming of not being able to stop a bicycle in the same manner during different breaking conditions, such as for both wet and dry weather conditions. There was no provision in a single compound brake pad for stopping while simultaneously controlling several braking situations, such squealing, grabbing, cleaning of the rim, etc More advanced brake pads have provided a partitioned unitary pad with at least two pads formed of dissimilar material, with the pad partitions configured for simultaneous engagement with the bicycle rim. U.S. Pat. No. 5,555,958 issued to Richard C. Everett on 17 Sep. 1996, and U S. Pat. No. 5,896,955 issued to Richard C. Everett on 27 Apr. 1999, show and describe such pads formed of different combinations of multi-rubber of elastomers to improve braking characteristics, such as wet or dry braking and/or to stop squealing and grabbing with the same pad.

Such devices are illustrative of the many and varied arrangements whereby attempts have been made to improve the braking of bicycles. However, the prior art brake pads, and even brake assemblies, remain limited in braking characteristic variation and flexibility. What is needed is a pad, or assembly, for improving dependable braking variation and flexibility under different riding conditions.

It is thus an aspect of the present invention to provide a new and improved bicycle braking assembly having interchangeable brake pads providing for variation and flexibility under different riding conditions.

It is also an aspect of the present invention to provide an improved bicycle brake assembly having a shoe, or holder, for receiving pads of different braking compounds that thus provides greater variation in overall braking characteristics of the assembly.

It is another aspect of the invention to provide an improved bicycle brake assembly having a re-useable shoe, or holder, for receiving brake pads composed of different braking compounds that can be interchanged and rearranged within the shoe to provide variation in braking characteristics of the assembly.

It is a further aspect of the present invention to provide a new and improved brake shoe having at least two removable and interchangeable pads formed of dissimilar material having dissimilar braking characteristics, with the pads configured for simultaneous engagement with the bicycle rim.

It is a yet another aspect of the invention to provide a new and improved bicycle brake assembly having a pad holder for receiving at least two brake pads having dissimilar braking characteristics, the pads configured for rearrangement in the holder to provide greater variation in braking characteristics. Other aspects, features and advantages of the invention will become apparent from a reading of the specification, when taken in conjunction with the drawings, in which like reference numerals refer to like elements in the several views.

SUMMARY OF THE INVENTION

In accordance with present invention, there is provided a brake shoe assembly for a bicycle having a brake system urging the pads of the assembly against the rim of the bicycle wheel. The brake shoe assembly includes a variety of unitary pads inserted sequentially into a main pad support member, or holder, the individual pads formed of different compositions whereby each provides a different desired characteristic to the braking of the bicycle. The pads may be replaced, removed, and/or rearranged within the holder. They are captured and retained in place by removable locking means such as a locking pin that is configured for mating detenting coacting engagement with a recess or groove in one or more of the loaded pads.

The pads are configured, arranged and dimensioned so that when inserted, or loaded into the holder, each (and all) pads have an operational braking surface in contact with the rim generally simultaneously. That is, the loaded pads will have the surfaces thereof generally coplanar with the planar braking surface of the bicycle rim. This provides for a brake assembly that has a reuseable shoe and that provides greater variation in overall braking characteristics.

Each brake pad can be formed of different combinations of multi-rubber or elastomers, not a particular combination, to improve braking under different conditions, such as wet or dry, with selection of pads. For instance, as examples, the selection of different multi-rubber or elastomers can be used to stop squealing and grabbing, while also giving the pad stopping power under wet or dry conditions, or may be selected for different conditions such as racing, or the like. Easy removal and replacement of the pads within the pad holder facilitates optimizing selection and arrangement of the pads. Various other compound combinations and braking characteristics will occur upon a reading of the application wherein various numerals in the drawings refer to like elements in the various views.

DESCRIPTION OF THE PREFERRED EMBODIMENT

Figure 1:
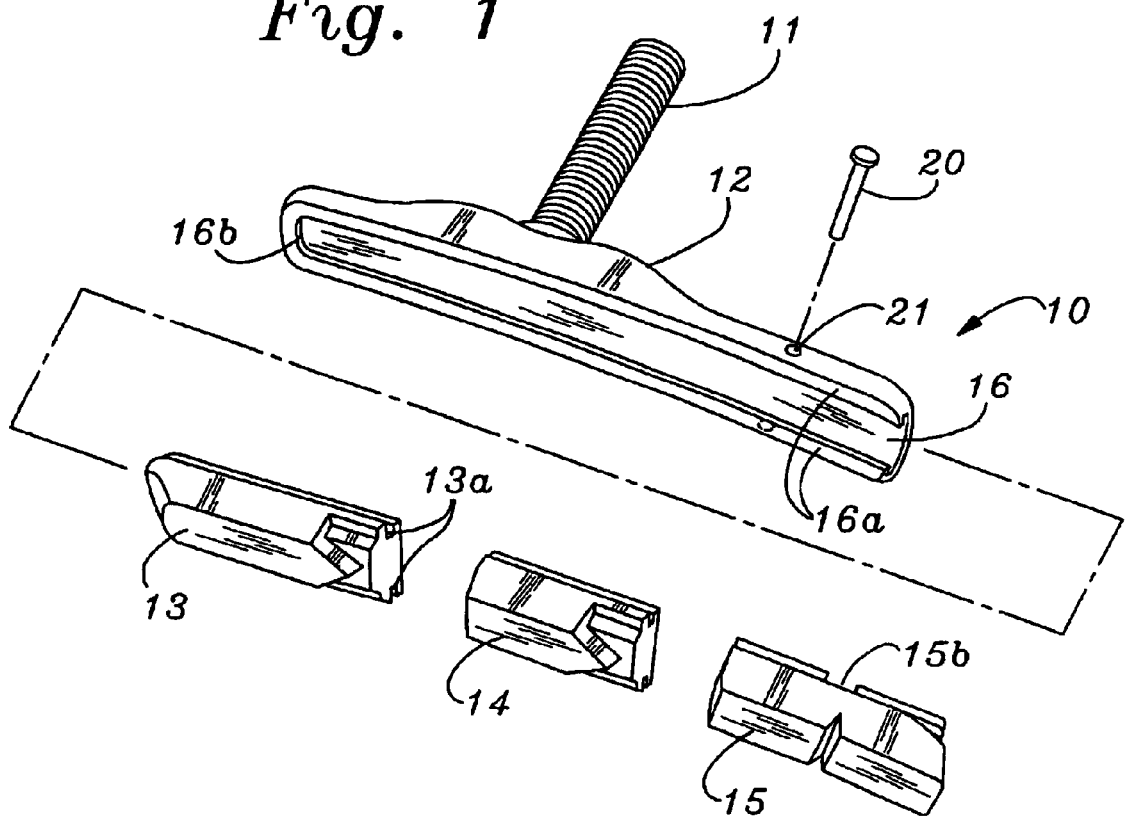
FIG. 1 is an exploded perspective view of a brake shoe assembly having brake pads of different configuration and braking compounds in accordance with the invention.
Figure 2:
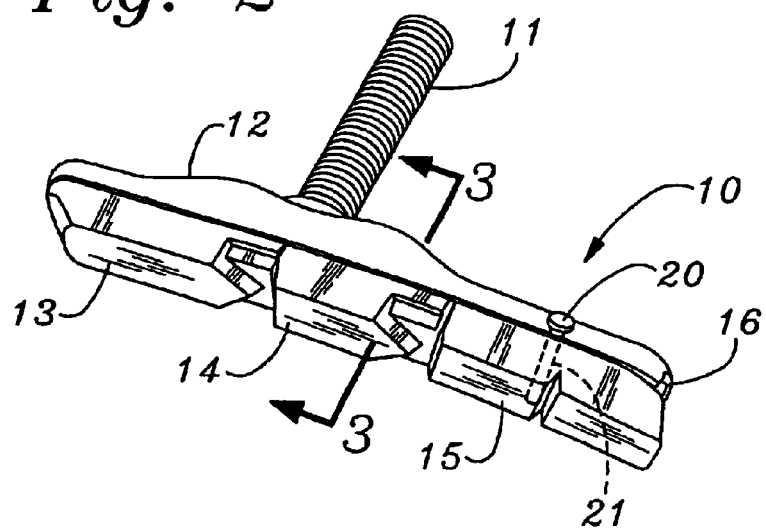
FIG. 2 is a perspective view of the brake shoe assembly of FIG. 1 assembled in accordance with the invention.

Referring now to the drawings, and particularly to FIGS. 1 and 2, there is shown a brake shoe assembly, generally designated 10. The assembly 10 includes a fastening means, such as a threaded stud member 11, secured to a support member, such as the backbone portion 12, of the brake shoe assembly 10.

Figure 3:
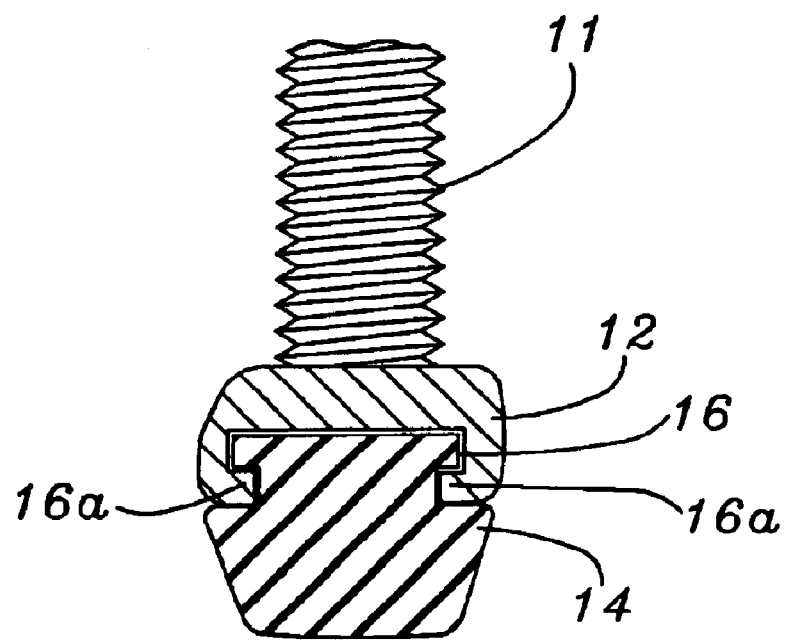
FIG. 3 is across-sectional view of the brake shoe of FIG. 2 along the line 3—3 of FIG. 2.

For purposes of illustrating and describing the invention, brake shoe 10 is shown with brake pad means in the form of brake pads 13, 14 and 15, each having different braking characteristics. As shown, each brake pad is unitarily formed with a different physical configuration, and may be, as well, formed of a different multi-rubber or elastomer compound to provide a pre-selected braking characteristic. Brake pads 13–15 are individually cured or molded and as indicated in the figures can be inserted and removed from brake shoe support member, or holder 16 as desired. As shown in FIG. 3, holder 16 is partially molded within holder 12. Brake pads 13–15 are further individually configured to be interchangeable in location within holder 16.

Even though the pads are shown individually molded with different configurations and having different braking characteristics, it is to be understood, although not shown, that a pad can be unitarily molded as to include two or more of pads shown, that is, for instance pads 13 and 14 could be molded as one piece.

In sequentially loading pads 13–15 into holder 16, a first selected pad 13 is placed into holder 16 such that pad indentations, or troughs, 13a rides along the holder rails 16a as more clearly shown in FIG. 3. Pad 13 is inserted fully along rails 16a until brought against the holder abutment 16b. Pads 14 and 15 have indentation similar to 13a for mating engagement with rail 16a, and are then similarly loaded, all in close proximity within the holder 16. After the pads 13–15 are inserted into holder 16 they are further captured in place by locking means such as locking pin 20. As shown, locking pin 20 is inserted into aperture 21 that extends a sufficient distance through the molded combination of backbone 12 and holder 16. Brake pad 15, the holding pad, is shown with recess or grove 15b through which pin 20 passes to thus capture pad 15 and thus pads 13 and 14. Generally, the holding pad will be selected of a compound and configuration to include rim cleaning characteristics, however, although not shown, it is to be understood that other pads with other characteristics may be fitted with a groove similar to groove 15b to thus be positioned as the holding pad.

Figure 4:
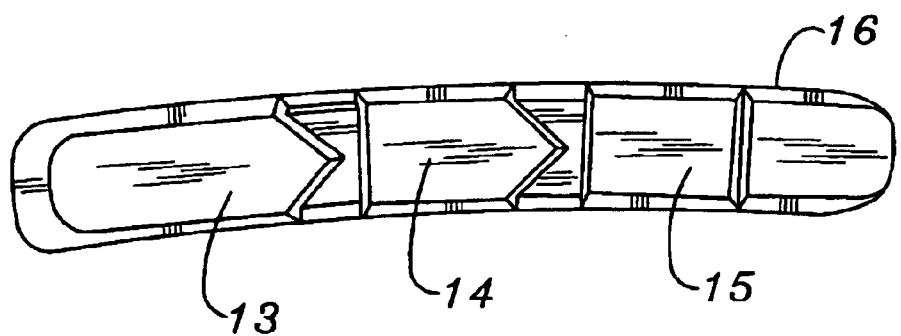
FIG. 4 is a bottom view of the brake shoe assembly of FIG. 1 assembled in accordance with the brake pad arrangement of FIG. 2.
Figure 5:
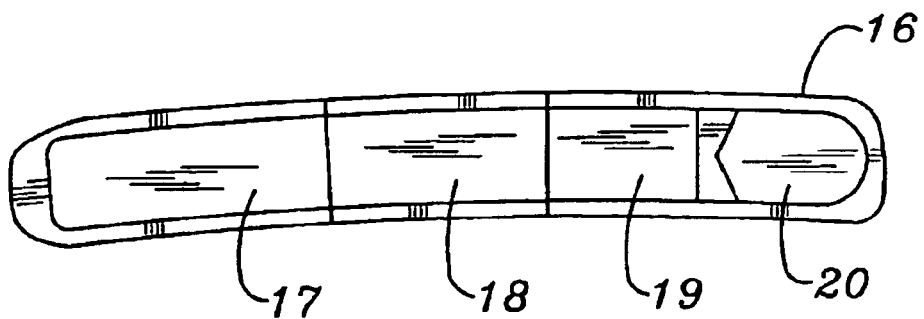
FIG. 5 is a bottom view of the brake shoe assembly of FIG. 1 assembled in accordance with another brake pad arrangement in accordance with the invention.

FIG. 4 is a bottom view of the brake shoe assembly of FIG. 1 assembled in accordance with the brake pad arrangement of FIG. 2 and more clearly showing brake shoe transverse curvature substantially in conformance with the radius of the bicycle wheel rim. Although for purposes of description of the invention three brake pads are shown, as shown in FIG. 5 other desired configurations and assemblies are understood to be within the scope of the invention. However, whatever pad arrangement is selected, the pads are each formed of compounds that provide a desired braking characteristic and arranged in a sequence that provides desired assembly characteristics. As loaded into and thus the curvature holder 16, the pads are in alignment in the holder 16 and in alignment relative to the direction of travel of the rim of the bicycle. Further, as described, both the composition of the individual pads as well as the pad sequence of the assembly may be changed by merely removing locking pin 20 and reselecting pads of different braking characteristics and/or rearranging the sequence of the pads.

As examples of selected braking characteristics, a pad may be formed of a compound that provides control or stabilization of squealing and/or grabbing of the pad, whereas another pad may be formed of a compound that provides high friction stopping power. Correspondingly, the compound selected for a particular braking characteristic may vary according to a desired primary use, such as under wet or dry weather conditions. In addition, the selected pads may be formed of different colors as a means of color coding a plurality of different pad compounds for different desired characteristics. However, regardless of the selection of brake pads, after loading into holder 16 the rim engaging surface of each pad is generally co-planar with that of the other pads. That is, the braking surfaces, or rim-engaging surfaces of the selected pads lie substantially in a common plane so that the required effect of each pad is accomplished on generally simultaneous engagement with the rim by each brake pad surface.

FIG. 5 is a bottom view of an alternative embodiment of the brake shoe assembly of FIG. 1 assembled with another brake pad arrangement in accordance with the invention. As shown, there are four brake pads 17–20 loaded into curved holder 16. As previously discussed, each pad may have different configurations and may, as well, be formed of different compounds of friction material. The pads are formed to fit into holder 16 as previously described, and are loaded and locked into holder 16 as previously described. That is, the holding pad will have a recess or groove similar to 15b configured for mating detenting coacting engagement with the pin 20 and the surfaces of the loaded pads will have the surfaces thereof generally coplanar with the planar braking surface of the bicycle rim.

For compound selection of the pads, any form of a multi-rubber or elastomeric compound may be utilized, with different combinations of multi-rubber or elastomers, not a particular combination, to improve or provide desired braking characteristics or capabilities. Likewise, any configuration can be selected for a given pad, with the understanding that for a given rim it is generally desirable, but not necessarily a requirement, that the braking surfaces of all pads engage the rim substantially at the same time. A combination of pads may be selected to provide improved braking of a bicycle for both wet and dry weather conditions thus controlling squeal (grabbing) and stopping, cleaning the rim and stopping, under different conditions such as racing or the like, etc. A single compound brake shoe pad can only do one or the other.

In accordance with present invention, there has been shown and described a bicycle brake shoe assembly wherein a variety of unitary pads are inserted into a main pad holder, the individual pads formed of different compositions whereby each provides a different desired characteristic to the braking of the bicycle. Easy removal and replacement of the pads within the pad holder can change the selection and arrangement of the pads.

While there has been shown and described preferred embodiments, it is to be understood that various other adaptations and modifications may be made within the spirit and scope of the invention.

What is claimed is:

1. A brake pad assembly for a bicycle having a brake system urging the pad assembly against the sidewall of the bicycle wheel rim, the combination comprising:

an elongate support member having a longitudinally extending brake shoe supported therefrom, said brake shoe having a closed end planar flanged recess with an open end for receiving multiple individually molded brake pads;

said brake pads sequentially and slidably positioned within said brake shoe along an axis parallel to the contact surface of said sidewall in abutting relationship with each formed of a different braking compound for imparting variously desired braking characteristics to said brake pad assembly;

said brake shoe and said brake pads configured for interchangeability and replacement of said brake pads within said brake shoe; and wherein each of said pads has a bicycle sidewall wheel rim engaging surface generally coplanar with the other.

2. The brake pad assembly according to claim 1 wherein said brake shoe has longitudinal transverse curvature substantially in conformance with the radius of the sidewall of the bicycle wheel rim.

3. The brake pad assembly according to claim 1 wherein each said brake pad is comprised of a top portion for mounting into said brake shoe and a bottom portion extending from said brake shoe, said bottom portion having a braking surface for contact with the sidewall of said bicycle wheel rim, said top portion and said bottom portion defined by an indentation along each non-abutting longitudinal side of said brake pad, said flange having inwardly projecting shoulders for capturing said top portion within said recess.

4. The brake pad assembly according to claim 3 wherein said brake shoe includes locking means for fixedly positioning said brake pads therein aligned longitudinally relative to one another and relative to said brake shoe, said locking means including brake shoe capture means for coacting with the configuration of the brake pad adjacent said open end for restraining said brake pads in said brake shoe.

5. The brake pad assembly according to claim 4 wherein said flange includes inwardly projecting shoulders for engaging with said indentations, said locking means further includes a transverse groove in the brake pad adjacent said open end and a locking pin, and said shoulders, said groove and said locking pin configured for coacting engagement whereby said locking pin is inserted through said groove whereby individual brake pads are restrained within said brake shoe.

6. The brake pad assembly according to claim 5 wherein each of said brake pads is molded as a unitary member formed of a different multi-rubber or elastomeric compound and said brake shoe includes locking means for positioning and restraining said brake pads therein;

said flanged recess includes inwardly projecting shoulders and said brake pads include sidewall indentations, said shoulders configured for slidably receiving said brake pads along said shoulders; and said assembly including a transverse groove in the brake pad adjacent said open end for restraining said brake pads in said brake shoe.

7. A brake pad assembly for a bicycle having a brake system urging a brake shoe against the sidewall of the bicycle wheel rim, the assembly comprising:

a bicycle brake shoe having a closed end planar flanged recess with an open end for receiving a plurality of unitary abutting brake pads sequentially positioned longitudinally therein along an axis parallel to the contact surface of said sidewall, each said brake pad having a bicycle wheel sidewall engaging braking surface generally coplanar with the other and each being formed of a different multi-rubber or elastomeric compound, each compound imparting a different preselected braking characteristic to said brake system;

each of said brake pads configured for slidable interchangeability and replacement within said brake shoe; and said brake shoe has longitudinal transverse curvature substantially in conformance with the radius of the sidewall of the bicycle wheel rim.

8. The brake pad assembly according to claim 7 wherein each of said plurality of brake pads is comprised of a top portion and a bottom portion, the portions defined by an indentation on each non-abutting side of said brake pad; and said brake shoe flange includes inwardly projecting shoulders configured for coacting with said brake pad indentations whereby said brake pads are slidably received along said shoulders in said brake shoe, said top portion captured in said brake shoe by said flange and said bottom portion extending from said brake shoe with a braking surface for planar contact with said sidewall of the bicycle wheel rim.

9. The brake pad assembly according to claim 8 wherein said brake shoe includes locking means for capturing and retaining said plurality of brake pads in abutting arrangement within said brake shoe, said locking means including means in said brake shoe coacting with the brake pad adjacent said open end for securing said brake pads in said brake shoe.

10. The brake pad assembly according to claim 9 wherein said means in said brake shoe coacting for securing said brake pads in said brake shoe includes a transverse groove in the brake pad adjacent said opening coacting with a locking member inserted within said groove transversely of said brake shoe.

11. The brake pad assembly according to claim 9 wherein said plurality of brake pads are retained in longitudinal planar alignment relative to one another and relative to said brake shoe recess.

12. A brake shoe assembly for a bicycle having a brake system urging a brake shoe against the sidewall of the bicycle wheel rim, the assembly comprising:

an elongate brake shoe having a planar recess therein with an open end and a closed end for axially receiving through said open end a plurality of individually molded brake pads in abutting arrangement sequentially positioned within said brake shoe along an axis parallel to the contact surface of said sidewall, each brake pad of a different compound for imparting a different braking characteristics to said brake pad assembly, said brake shoe and said brake pads configured for slidable replacement and interchangeability of said brake pads within said brake shoe;

each of said plurality of brake pads is comprised of a top portion and a bottom portion defined by indentations in each non-abutting side of said brake pad and said brake shoe includes an engagement rail extending completely around said recess except for said open end and having inwardly projecting shoulders configured for coacting engagement with said indentations whereby said brake pads are slidably received along said rail restrained in an axial position in said brake shoe, said top portion contained within said brake shoe by said rail and said bottom portion extending from said brake shoe and having a braking surface for contact with said sidewall of the bicycle wheel rim;

said planar brake shoe having longitudinal transverse curvature substantially in conformance with the radius of the sidewall of the bicycle wheel rim; and wherein said brake shoe and the brake pad adjacent said open end have coacting means for securing said brake pads in said brake shoe.

13. The brake pad assembly according to claim 12 wherein each of said brake pads is molded as an individual unitary member for imparting a variety of braking characteristics to said brake pad assembly.

14. The brake pad assembly according to claim 13 wherein each of said brake pads is formed of a different multi-rubber or elastomeric braking compound.

15. The brake pad assembly according to claim 12 wherein said coacting means for securing said brake pads in said brake shoe includes a transverse groove in the brake pad adjacent said opening coacting with a locking pin inserted through said groove.

16. The brake pad assembly according to claim 12 wherein each said brake pad when inserted into said brake shoe has a bicycle wheel sidewall engaging surface generally coplanar with the other and with said sidewall.

* * * * *